United States Patent [19]
Miranda

[11] 3,834,654
[45] Sept. 10, 1974

[54] BOXPLANE WING AND AIRCRAFT

[75] Inventor: Luis R. Miranda, Sherman Oaks, Calif.

[73] Assignee: Lockheed Aircraft Corporation, Burbank, Calif.

[22] Filed: Mar. 19, 1973

[21] Appl. No.: 342,823

[52] U.S. Cl.................. 244/13, 244/45 R, 244/91
[51] Int. Cl.............................................. B64c 3/06
[58] Field of Search............ 244/13, 45 R, 35 R, 2, 244/12 CW, 91; D71/1 E, 1 F

[56] References Cited
UNITED STATES PATENTS
1,264,037   4/1918   Emmons .......................... 244/45 R
2,194,596   3/1940   Henter ........................ 244/45 R X
2,461,805   2/1949   Barker ............................. 244/45 R
2,920,842   1/1960   Decker et al. ....................... 244/13

*Primary Examiner*—Duane A. Reger
*Assistant Examiner*—Barry L. Kelmachter
*Attorney, Agent, or Firm*—Billy G. Corber; Lowell G. Turner

[57] ABSTRACT

An aircraft wing system wherein a first pair of rearwardly swept wings is interconnected at the wing tips to a second pair of forwardly swept wings, the interconnection being accomplished by a pair of vertically swept fins, the two pair of wings being horizontally and vertically staggered relative to one another. Each pair of wings is also structurally attached to another aircraft component.

15 Claims, 12 Drawing Figures

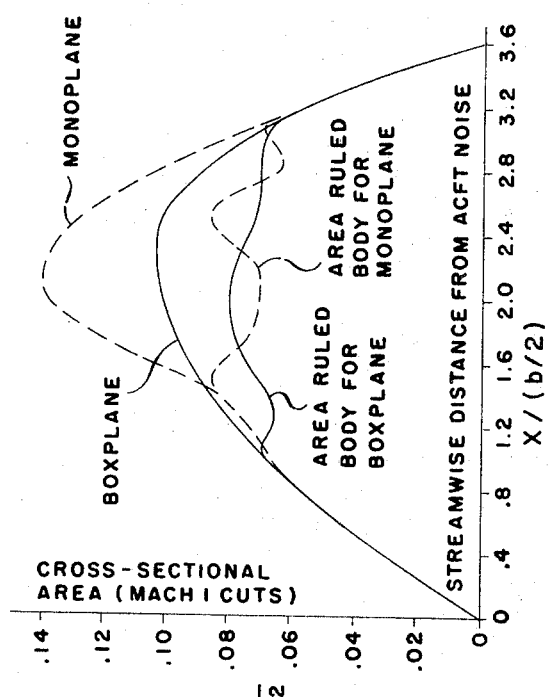
FIG. 11
FIG. 12
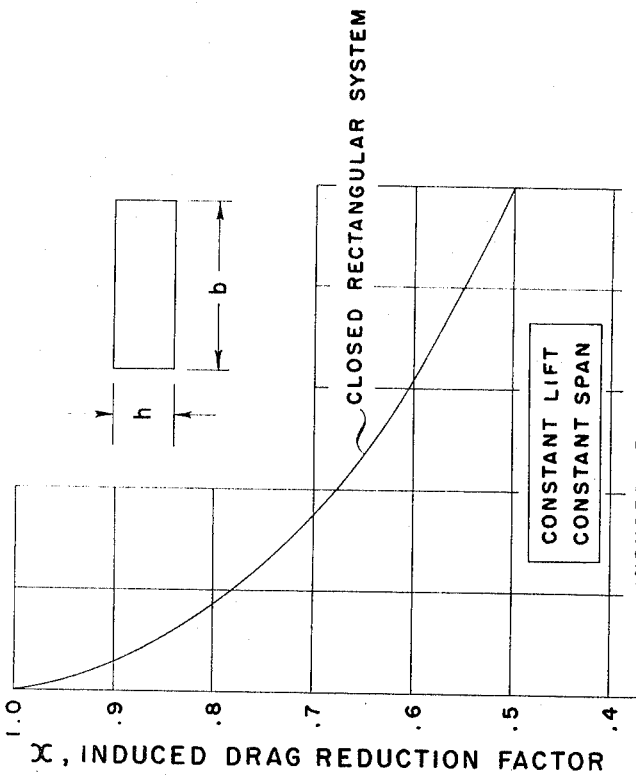
FIG. 10

BOXPLANE WING AND AIRCRAFT

BACKGROUND OF THE INVENTION

1. Field of the Invention

This invention pertains to the field of improved aircraft wings. More particularly, it pertains to wing systems for aircraft wherein low induced drag and an improved close combat maneuverability are requirements.

2. Description of the Prior Art

The utilization of two wings upon an aircraft is as old as the field of aircraft itself. To provide for a forward or a rearward sweep of the two wings of a biplane is additionally old, as is illustrated in many patents which have been issued upon bi-wing aircraft. The following patents are basically representative of such prior art teachings.

U.S. Design Pat. No. 192,064 illustrates an aircraft wherein a large number of wings extend in a rearwardly swept direction, as offset from the fuselage portion of the aircraft by a series of fins. The result is what may be termed an exaggerated box wing construction.

U.S. Pat. Nos. such as 1,613,091 and 3,329,376 illustrate the use of dual wings or housings, but with respect to which the wings are curved to accommodate their connections at the wing tips or intermediate thereof.

Of some interest from a general wing shape standpoint is the Emmons U.S. Pat. No. 1,264,037, FIG. 18 of which illustrates wings swept in the general manner of the present box wing construction, but which overlap at their wing tips and which are not interconnected structurally at the wing tips.

Background information for the present invention was provided by Professors Max Munk and Ludwig Prandtl by virtue of their theory which was generated in the late 1910's; i.e., that the closed rectangular box plane was the optimum wing system for minimizing induced drag in an airplane configuration of given span and height dimensions and operating at a given overall lift. Their theory with respect to box wing type construction was stated, for example, in a National Advisory Committee for Aeronautics publication entitled, "The Minimum Induced Drag of Airfoils," Report No. 121, published by the Government Printing Office in 1921. Their studies, however, related only to straight line shaped airfoils, not to stagger or sweep with respect thereto. Their theories, although long available, to this date have not been successfully incorporated into a practicable aircraft configuration.

SUMMARY OF THE INVENTION

The boxplane wing of this invention relates to the utilization of multiple, oppositely swept wings on an aircraft, staggered both in elevation and longitudinally, the tips of the multiple wings being connected by vertical fins, thereby providing an aircraft configuration which is a radical departure from conventional aircraft designs.

More specifically, the invention relates to a boxplane wing structure wherein two pairs of wings are provided, a first pair being rearwardly swept and the second pair being forwardly swept. These wing pairs are joined at their tips by swept vertical fins to provide structural rigidity and dynamic control surfaces. The wing pairs are staggered from one another both longitudinally and vertically for optimum aerodynamic efficiency and minimal aerodynamic interference with one another. Work accomplished in testing the concept of the present boxplane wing has confirmed that a lifting system in the form of a closed rectangle, as taught by Munk and Prandtl, has the least induced drag of all the lifting systems which do not surpass the boundaries of the aerodynamic surfaces. The introduction of sweep and stagger, two features which are fundamental of the practical application of this concept to high speed flight, does not change the conclusions reached by Munk's stagger theorem on induced drag since, as stated in that theorem, the total drag of any lifting system remains unchanged if the lifting elements are displaced in the direction of flight, provided their total lift force remains constant.

The boxplane concept reduces the induced drag for a given span and lift by modulating the trailing vorticity distribution; for example, a boxplane with a height/span ratio of 30 percent would theoretically achieve a reduction of induced drag of approximately 40 percent when compared directly to a conventional monoplane configuration of the same span and lift.

A primary objective of this invention is to successfully incorporate the use of that theoretical information generated by Munk and Prandtl into a practical aircraft structure wherein induced drag is minimized.

Another object of this invention is to provide an aircraft having improved controllability and maneuverability with inherent direct side force control and direct lift control capabilities afforded by the tip fin and multiple-wing control surfaces.

Another significant object is to provide such a wing system wherein the trim drag penalty is reduced without the introduction of additional surfaces or down loads, thereby significantly reducing overall drag for maneuvering conditions.

Another object is to minimize interference problems during transonic operation.

A further object of invention is to provide an overall aircraft arrangement which is well-suited for the development of favorable supersonic wave interference characteristics and to provide improvements in reducing induced drag throughout the subsonic, transonic, and supersonic speed regimes.

Objects of invention also include the provision of a wing concept which facilitates a compact design ideally suited for storage in close quarters, such as for aircraft carrier operation, a closed frame structural arrangement which is inherently stiffer and more efficient than are cantilevered constructions in conventional aircraft, providing a high roll rate capability, and the provision of corner bodies or rounded sections in the box wing corners to further reduce drag characteristics.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawing.

BRIEF DESCRIPTION OF THE DRAWINGS

FIG. 10 is a graph illustrating theoretical induced drag reduction of the boxplane wing as compared to a monoplane;

FIG. 11 is a graph showing experimental verification of induced drag reduction; and FIG. 12 is a graph showing reductions in transonic wave drag of the boxplane, as compared to a monoplane.

DETAILED DESCRIPTION OF THE INVENTION

Figure 1:
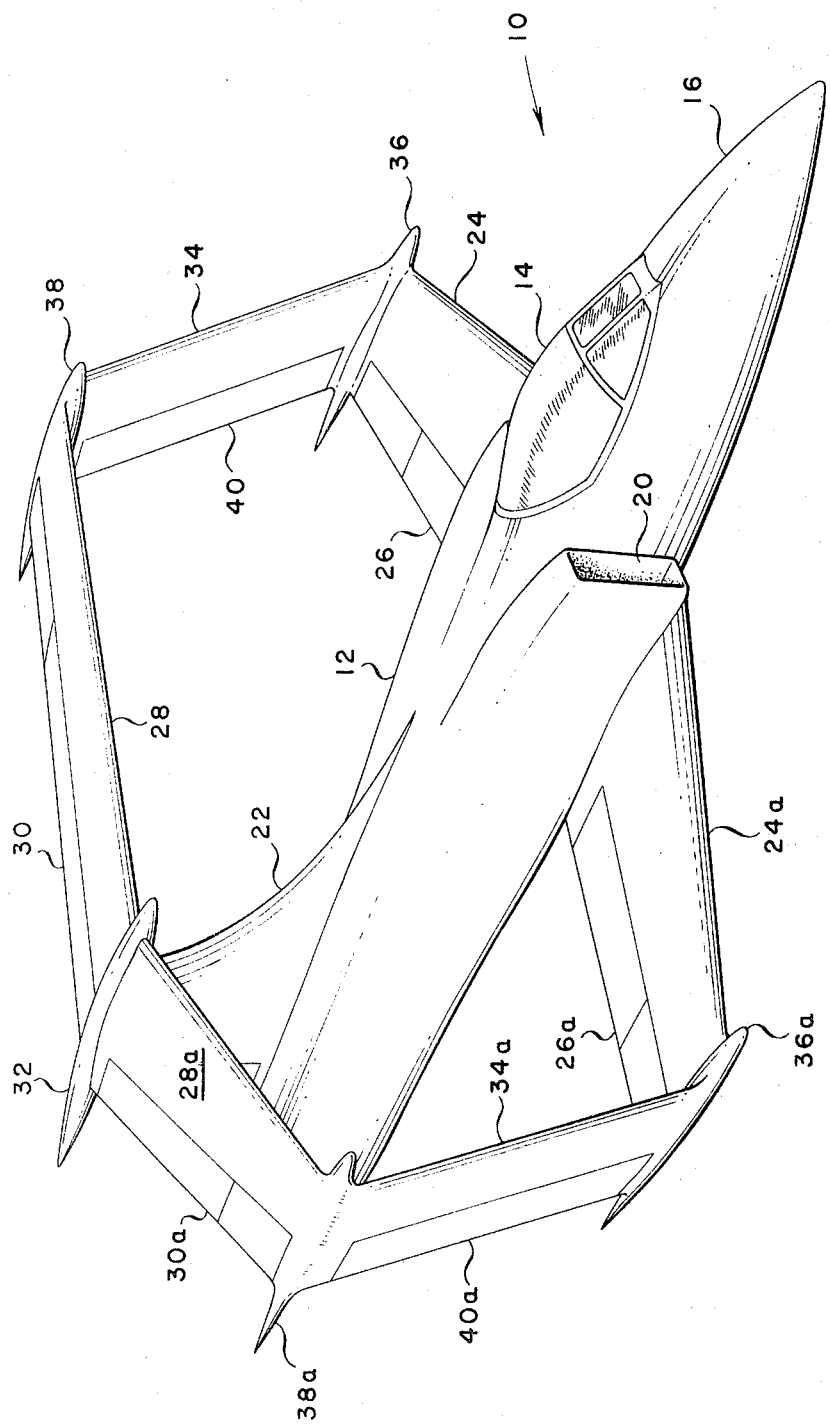
FIG. 1 is a perspective view of an aircraft incorporating the boxplane wing of this invention.
Figure 2:
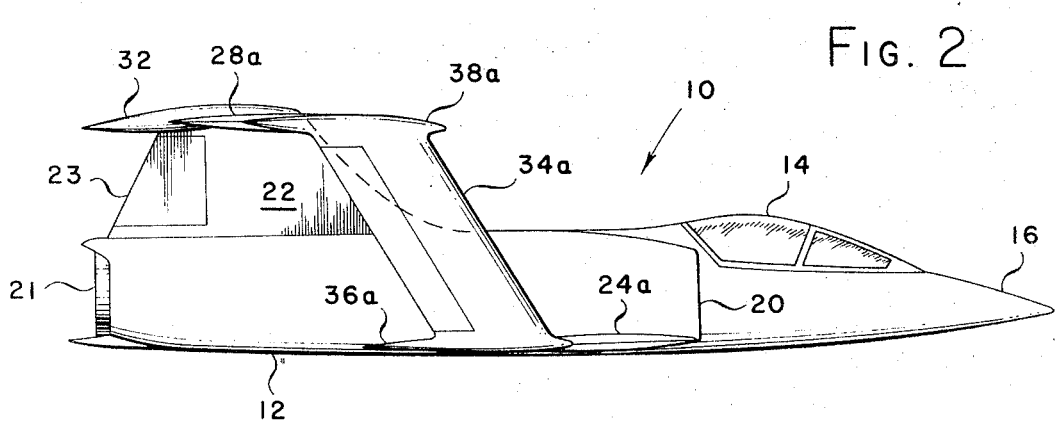
FIG. 2 is a plan view of the aircraft and wing configuration of FIG. 1.
Figure 3:
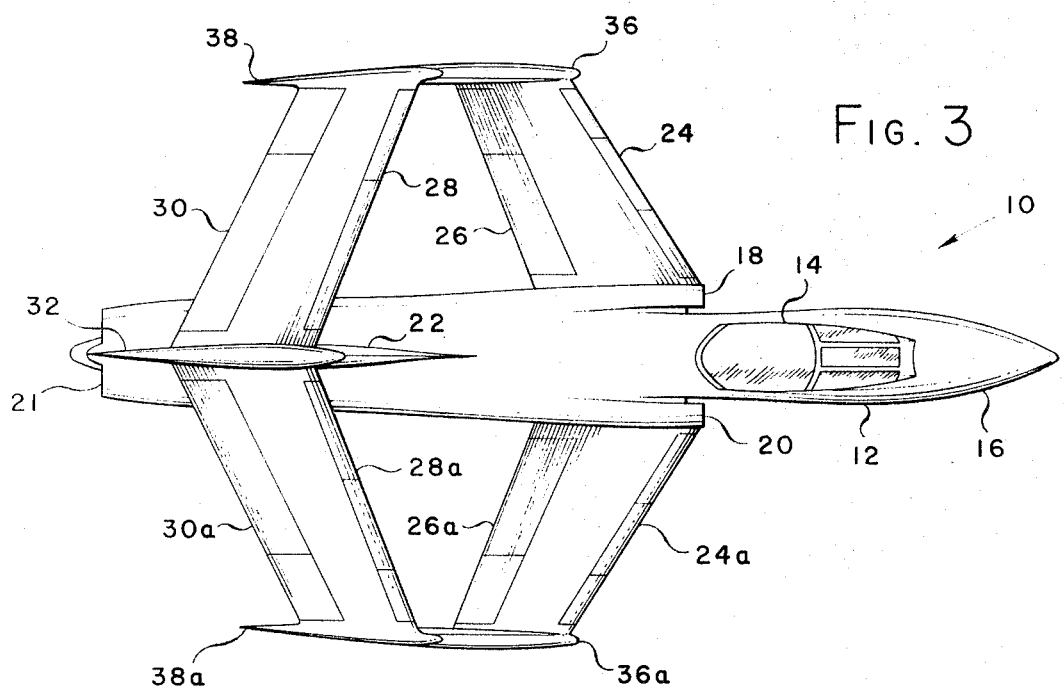
FIG. 3 is an elevational view of the FIG. 1 aircraft.

Intensive studies conducted in relation to the boxplane wing of this invention, both analytical and in practical hardware configurations, have demonstrated that the invention illustrated and described herein possesses features which are highly attractive for utilization with aircraft of diverse utilitarian functions. While the following descriptions of boxplane wings have particular significance to military aircraft, they are not to be considered as being so limited.

FIGS. 1-4 illustrate an aircraft incorporating the invention. Therein the overall aircraft is indicated by the numeral 10. Aircraft 10 includes a fuselage 12 having a cockpit 14 adjacent its nose section 16. Air inlet nozzles 18 and 20 are provided upon either side of the fuselage 12. A vertical fin 22 is provided at the after extremity of the fuselage 12. Each of the aforementioned components is essentially conventional in design.

A pair of rearwardly swept wings 24 and 24a are attached to a lower portion of the fuselage 12 slightly forward of its mid-point. Control surfaces 26 and 26a are controllably affixed to the respective trailing edges of the wings 24 and 24a.

Attached to the upper extremity of the vertical fin 22 is a pair of forwardly swept wings 28 and 28a having rearwardly disposed control surfaces 30 and 30a controllably affixed thereto. A streamlined aerodynamic center body 32 is optionally provided at the joinder of the forwardly swept wings 28 and 28a, providing the structure for attachment of the forwardly swept wings to the vertical fin 22.

Connecting the tips of the rearwardly swept wings 24 and 24a to the tips of the forwardly swept wings 28 and 28a, respectively, are a pair of vertical fins 34 and 34a. Although not mandatory, the vertical fins 34 and 34a in the embodiment illustrated in FIGS. 1-4 are connected to the respective wings by a plurality of streamlined center bodies. Bodies 36 and 36a are provided at the inter-connections or corners defined by the tip fins and the rearwardly swept wings and bodies 38 and 38a are at the junctures of the tip fins with the forwardly swept wings. Control surface 40 and 40a are provided on the trailing edges of the tip fins 34 and 34a, respectively. Each of the aforementioned center bodies is axially parallel to the axis of the fuselage 12.

Figure 4:
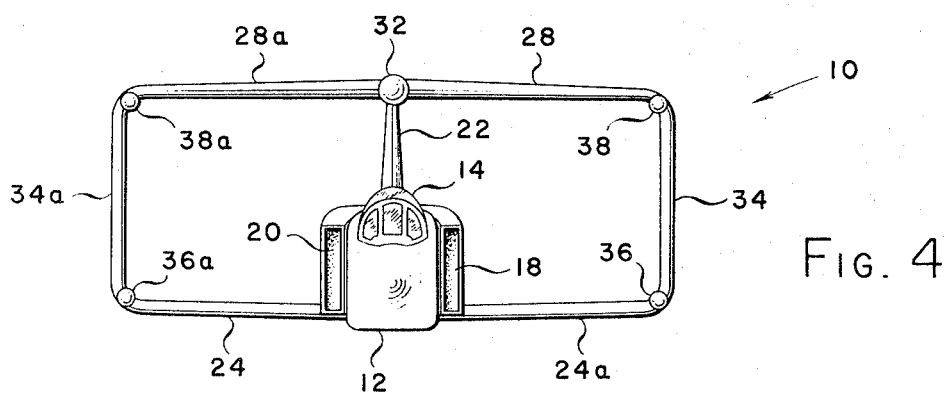
FIG. 4 is a front elevational view of the FIG. 1 aircraft.
Figure 5:
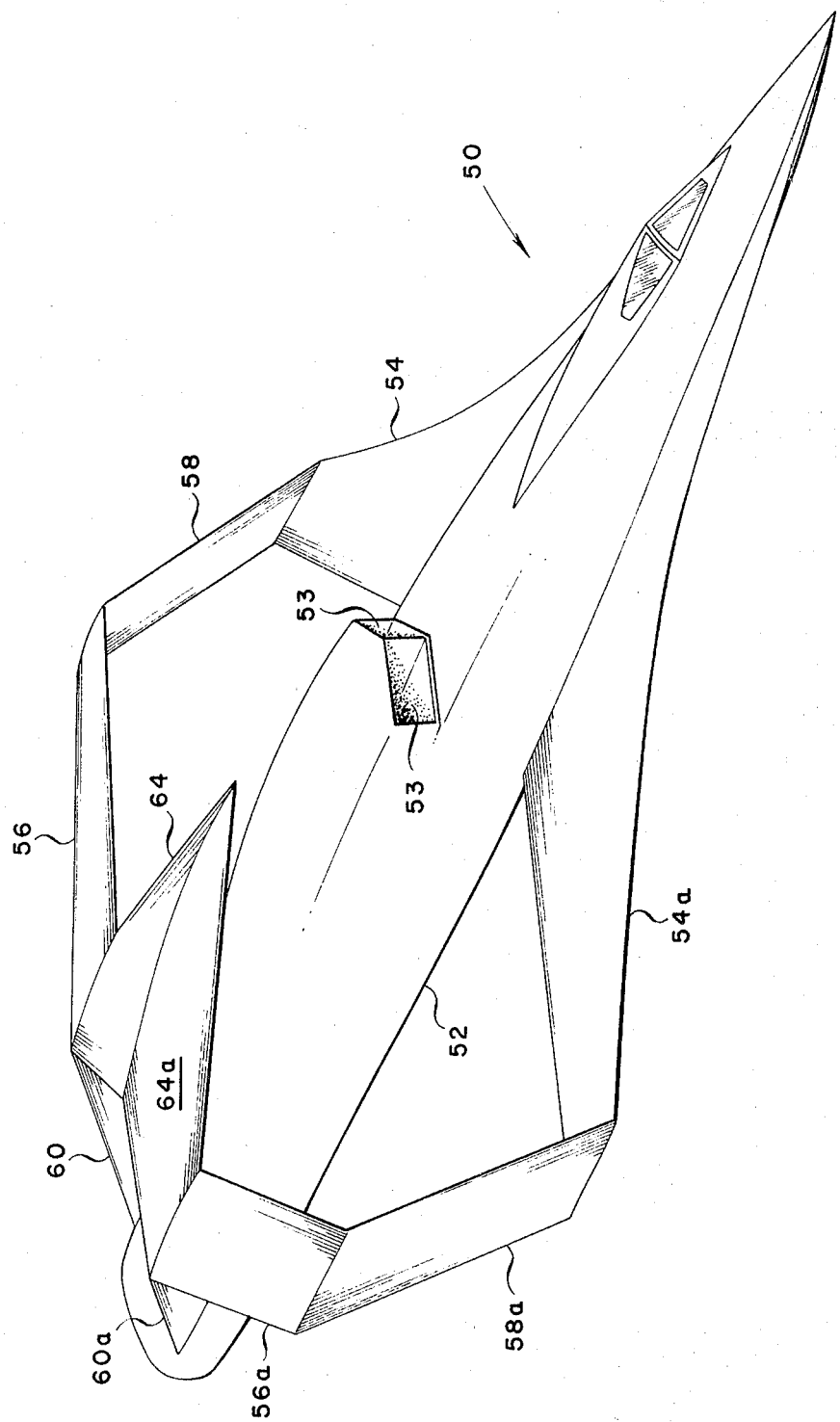
FIG. 5 is a perspective view of a supersonic aircraft embodiment incorporating the boxplane wing construction of this invention.

A viewing of the aircraft 10, particularly as illustrated in FIGS. 1 and 4, will reveal that the above-described wing construction is essentially that of a rectangular box; thus, the designation of this unique configuration as a boxplane wing. As will be noted from the foregoing, such a boxplane wing configuration generally comprises the described rearwardly swept wings, the forwardly swept wings and the interconnection of the tips of such wings by swept vertical fins. The wings are appropriately connected to conventional aircraft structure to provide a maximum of structural rigidity and a minimum of aerodynamic interference, while accommodating the numerous features of aerodynamic significance described herein.

Several of the particular advantages flowing from utilization of the boxplane wing configuration are enumerated below.

Longitudinal Control Power

Applications of the boxplane wing concept to combat aircraft usually incorporate control surfaces in the trailing edge of both the forward and rearward wing surfaces, thereby providing unusually high values of pitch power control, direct-lift-control power, and post-stall-control power. Such benefits flow from the existence of the unusually large control surface areas available by virtue of the presence of two additional wings to accommodate support and operation of those control surfaces.

Direct-Side-Force Control

With its large vertical tip fin surfaces (which have trailing-edge control surfaces) being located close to the aircraft aerodynamic center, the boxplane configuration is ideally suited to the generation of large side forces which are relatively free of roll-coupling and yaw.

Control-Configured-Vehicle Adaptability

In view of the aforementioned potential for high values of pitch control power, direct lift control power and direct side-force control power, the boxplane concept provides an ideal environment for the full exploitation of controlled configured vehicle concepts, which can be incorporated in a variety of ways. For example, the boxplane wing aircraft may be provided with a gust-alleviation system in both the vertical and horizontal planes. This would be expected to provide significant benefits in stabilizing the aircraft as a weapons platform and in enhancing the precision of its flight path; this in addition to improving the ride quality of the vehicle and pilot performance in low-level, high-speed maneuvers. Additionally, control-configured-vehicle integration reduces vulnerability of the aircraft to structural damage. For example, the boxplane enhances the maintenance of pitch control via the front wing control surfaces only in the event that the aft wing control surfaces should for any reason become inoperable.

Improved Transonic Area Progression

The enclosed volume and lift of the boxplane is spread over a longer (streamlined) distance than is the case for a comparable mono-wing airplane configuration, thereby offering a reduction in transonic wave drag.

Structural Rigidity

The closed-frame structural arrangement of the boxplane concept results in an easing of various aeroelastic problems, since the wing tips provide increased torsional stiffness in the wing tip region. This feature is exploited by locating the high-speed aileron surfaces further inboard upon the wings than would be structurally possible with more conventional configurations. This structural rigidity, in further consideration of the low aspect ratio of the boxplane, also results in an ability to provide unusually high roll rates.

Compactness

The overall compactness of the boxplane configuration is a desirable military feature, particularly where span limitations exist and the penalties for wing-folding capabilities are undesirable. The boxplane offers ease of storage in aircraft-handling ships, ease of concealment in revetments, reduced spares logistics in view of the small wing panel sizes, ease of cargo-hold-dimension requirement in the case of parachute-retrieval of remotely piloted vehicles, as well as several other less obvious advantages.

A typical application of the box wing concept to supersonic aircraft is more specifically illustrated in FIGS. 5-8. Therein the supersonic aircraft 50 having a fuselage 52 and air inlet nacelles 53, is provided with rearwardly swept wings 54 and 54a and forwardly swept wings 56 and 56a, respectively joined at their tips by swept vertical fins 58 and 58a.

In this instance two forwardly swept rudder-supporting vertical fins 60 and 60a are fixed to opposite rearward sides of the fuselage 52. These fins are canted slightly outward from the fuselage.

Figure 6:
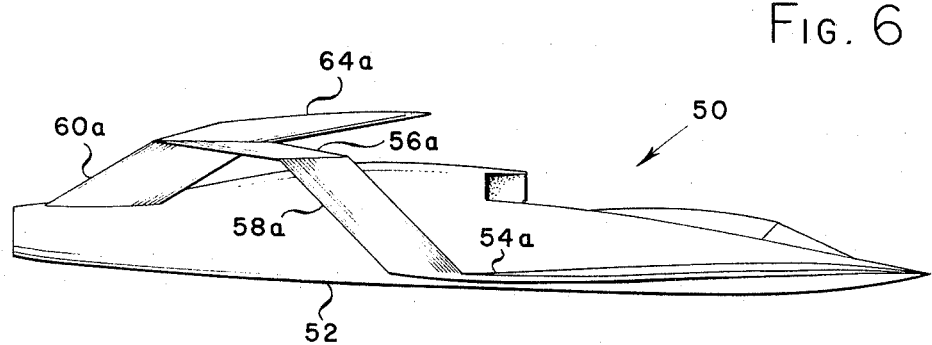
FIG. 6 is a plan view of the supersonic aircraft of FIG. 5.
Figure 7:
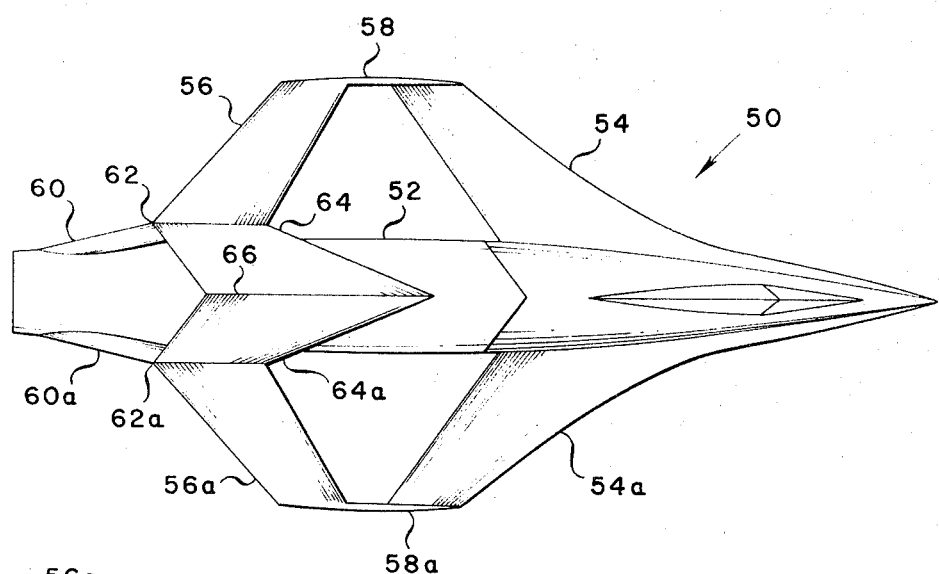
FIG. 7 is a side elevational view of the FIG. 6 aircraft configuration.
Figure 8:
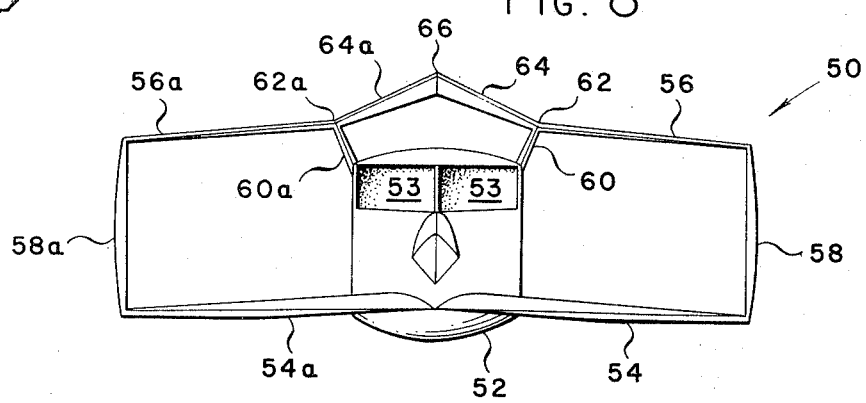
FIG. 8 is a front elevational view of the FIG. 5 aircraft.

Centrally of the forwardly swept wings 56 and 56a and attached to the inboard ends thereof at the positions indicated as 62 and 62a, are two forwardly swept airfoil sections 64 and 64a cooperatively defining a central wing portion. The wings 56 and 56a, together with the airfoil sections 64 and 64a, are cooperatively attached to the upper extremities of the forwardly swept vertical fins 60 and 60a at the attachment positions 62 and 62a. The airfoil sections 64 and 64a are also mutually connected to one another at their inboard extremities along the line 66, which line 66 additionally falls along the longitudinal centerline of the aircraft, as illustrated most specifically in FIG. 7. The airfoil sections 64 and 64a are canted upwardly from positions 62 and 62a in a triangular or hip-shaped pattern, joining at the aforementioned position 66. This feature is best illustrated in FIGS. 6 and 8. Such a structural configuration provides the potential of intensifying favorable wave interference by capturing the shockwave, such as shown at 55 in FIG. 6, induced by the body and/or nacelle, such as nacelles 53.

One of the important characteristics of the boxplane concept is its broad applicability to both subsonic and supersonic aircraft, particularly in relation to the fact that the physical nature of the induced drag mechanism is independent of flight Mach number. Consequently, the induced drag reduction provided by the boxplane is equally obtainable throughout the entire speed range. This requires, however, that transonic speeds also be considered.

Figure 9:
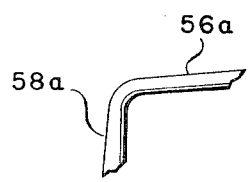
FIG. 9 is a partial front view showing an alternative embodiment of a wing-to-vertical fin corner.

The most probable region wherein transonic speeds will provide problems is at the wing-to-tip-fin corner intersections, this being due to the shock-boundary layer interaction phenomenon experienced in that region. Each of such corners can be treated essentially in the manner illustrated in FIG. 9 wherein rounding off the corner of the intersections, as indicated at 68 provides the structure for obviating to a large extent the shock-boundary layer problem. The utilization of a shock-body at this junction can also be accommodated. This facilitates the application of boundary layer control to the corner junctions through blowing, suction, or the use of vortex generators. Such additions to the basic structure of this invention are usable to solve any separation problems which are otherwise present, as caused by the junctions.

Three fundamental components of drag operate upon an aircraft at supersonic speeds; i.e., friction drag, vortex induced drag, and wave drag. While the flow mechanisms that generate friction and vortex drag are essentially the same for both subsonic and supersonic flows, wave drag is a phenomenon which is unique to supersonic flow. It, in turn, can be considered as being composed of three elements; i.e., wave drag due to volume, due to lift, and due to volume-lift interference. The boxplane configuration demonstrates a potential for substantially reducing wave drag components due to volume and lift, turning the volume-lift interference component into a favorable rather than an adverse effect. This is due to its favorable area progression characteristics (explained in greater detail below) and to the possibility of tailoring the multiple airfoil surfaces that comprise the boxplane wing in order to generate favorable wave interference.

Charts which illustrate the technical ramifications of the structures described above are provided in FIGS. 10-12.

FIG. 10 charts the theoretical calculation of the induced drag reduction factor in relation to the height-to-span ratio. It graphically indicates a substantial induced drag reduction of the boxplane configuration. Assuming, for example, a practical height-to-span ratio of 0.3 in a typical combat aircraft configuration, the FIG. 9 graph shows that a 40 percent reduction in drag can be obtained in the boxplane as commmpared to a conventional monoplane of the same overall span loading; i.e., the same $L_b$, where L is the total aerodynamic lifting force and b is the wing span.

FIG. 11 charts actual experimental data derived through wing tunnel experiments in practically demonstrating the reduction of induced drag in the boxplane as compared to a monoplane. This experimental verification confirms the theoretical reductions shown in the graph of FIG. 10.

In FIG. 12, the normal cross-sectional area progression of a boxplane wing is compared to that of a monoplane having the same fuselage length and volume, wing area, span and airfoil thickness ratio as those of the boxplane. Since, for a given aircraft length, the volume wave drag is proportional to the maximum cross-sectional area, and to the smoothness of the area progression curve, it is then evident that the boxplane will generate less wave drag than the corresponding monoplane at transonic speeds. Similar arguments apply to the wave drag due to lift, and to wave drag in general at higher Mach numbers for a properly designed boxplane. This graphic representation indicates very clearly the drag reduction, the solid lines representing the boxplane configuration and the dashed lines indicating those of the aforedescribed monoplane.

While certain preferred embodiments of the invention have been specifically disclosed and described, it will be understood that the invention is not so limited. Its many variations will be readily apparent to those

I claim:

1. A boxplane wing for use on an aircraft having structure including a fuselage with nose, mid-body and exhaust sections, and at least one tail fin means extending from the fuselage and having control surfaces means thereon, comprising:
   a pair of rearwardly swept wings fixed to said aircraft structure;
   a pair of interconnected forwardly swept wings fixed to said tail fin means and being both vertically and axially displaced with respect to said rearwardly swept wings; and
   a pair of swept vertical fins fixed to and interconnecting said rearwardly swept wings and said forwardly swept wings at extremities thereof remote from the aircraft structure;
   said wings and said last-mentioned vertical fins cooperatively defining a closed box-shaped structure when viewed from the forward extremity of the aircraft.

2. The boxplane wing of claim 1 wherein:
   said rearwardly swept wings are fixed to said fuselage forward of said vertical fins; and
   said forwardly swept wings are fixed to an upper extremity of said tail fin means.

3. The boxplane wing of claim 2 wherein:
   said rearwardly swept wings are fixed to a lower extremity of said fuselage.

4. The boxplane wing of claim 1 wherein:
   said wing, when viewed from the forward extremity of the aircraft is substantially rectangular in shape.

5. The boxplane wing of claim 1 wherein:
   a streamlined center body is positioned at each juncture of one of said vertical fins and one of said wings and axially parallel to the axis of said fuselage.

6. The boxplane wing of claim 5 wherein:
   said rearwardly swept wings are fixed to said fuselage;
   said forwardly swept wings are fixed to an upper extremity of said tail fin means; and
   a streamlined center body axially parallel to the fuselage is fixed to said forwardly swept wings and to said tail fin means at the juncture thereof.

7. The boxplane wing of claim 1 wherein:
   an aerodynamic control surface is controllably positioned upon the trailing edge of each of said vertical fins.

8. In an aircraft having a fuselage and a tail fin including control surface means, a boxplane wing comprising:
   a pair of rearwardly swept wings fixed to said fuselage and having leading, trailing edges and tips, control surface means pivotally attached to each of said trailing edges of said wings;
   a pair of interconnected forwardly swept wings, a central portion thereof being fixed to an upper extremity of the tail fin and having leading and trailing edges and tips,
   control surface means pivotally attached to said trailing edge of each of said forwardly swept wings;
   a pair of swept vertical fins, each such fin having leading and trailing edges and being connected to a said tip of one of said rearwardly swept wings and a tip of one of said forwardly swept wings to provide with said wings a continuously enclosed wing structure,
   control surface means pivotally attached to said each of said trailing edges of said swept vertical fins; and
   said forwardly swept wings being displaced axially rearward and vertically above said rearwardly swept wings.

9. In an aircraft having a fuselage and tail fin means fixedly extending therefrom, a boxplane wing comprising:
   a pair of rearwardly swept wings fixed to said fuselage and terminating in wing tips;
   a pair of interconnected forwardly swept wings fixed to said tail fin means and terminating in wing tips;
   a pair of vertical fins, each said vertical fin structurally fixed to said wing tip on one of said rearwardly swept wings and said wing tip on one of said forwardly swept wings; and
   control surface means pivotally and controllably attached to at least two selected ones of said wings and fins.

10. The boxplane wing of claim 9 wherein:
    said control surface means is provided upon each of said wings and of said vertical fins.

11. The boxplane wing of claim 9 wherein:
    said forwardly swept wing includes a central section which is rearwardly swept.

12. The boxplane wing of claim 11 wherein:
    said rearwardly swept central section includes a positive angle of attack relative to the axis of said fuselage.

13. The boxplane wing of claim 11 wherein:
    said central section includes two halves, the joinder of said halves being the highest region thereof, said central section having substantially a hip-shaped pattern.

14. The boxplane wing of claim 9 wherein:
    an intersection is defined by each said wing tip being fixed to one of said vertical fins;
    each said intersection being shaped as a rounded corner.

15. The boxplane wing of claim 9 wherein:
    an intersection is defined by each said wing tip being fixed to one of said vertical fins;
    each said intersection being provided with shock-boundary layer relief means to thereby minimize transonic speed regime boundary layer problems.

* * * * *